US008819411B2

(12) United States Patent
Inoue

(10) Patent No.: US 8,819,411 B2
(45) Date of Patent: Aug. 26, 2014

(54) INFORMATION PROCESSING APPARATUS, COMMUNICATION SYSTEM, METHOD OF CONTROLLING THEM, AND STORAGE MEDIUM

(75) Inventor: Go Inoue, Fujisawa (JP)

(73) Assignee: Canon Kabushiki Kaisha (JP)

( * ) Notice: Subject to any disclaimer, the term of this patent is extended or adjusted under 35 U.S.C. 154(b) by 765 days.

(21) Appl. No.: 12/721,846

(22) Filed: Mar. 11, 2010

(65) Prior Publication Data

US 2010/0235639 A1  Sep. 16, 2010

(30) Foreign Application Priority Data

Mar. 13, 2009  (JP) ................. 2009-061287

(51) Int. Cl.
*H04L 29/06* (2006.01)
*G06F 1/32* (2006.01)

(52) U.S. Cl.
CPC ............ *G06F 1/3203* (2013.01); *G06F 1/3215* (2013.01); *G06F 1/3284* (2013.01); *Y02B 60/1267* (2013.01); *Y02B 60/41* (2013.01); *Y02B 60/32* (2013.01)
USPC ......................................... 713/151; 713/323

(58) Field of Classification Search
CPC .................................................. G06F 1/3203
USPC ................................................. 713/151, 323
See application file for complete search history.

(56) References Cited

U.S. PATENT DOCUMENTS

| 2006/0236143 A1 | 10/2006 | Kidoguchi |
| 2006/0239273 A1* | 10/2006 | Buckman et al. ........ 370/395.41 |
| 2008/0133953 A1* | 6/2008 | Kawaji ........................... 713/322 |
| 2010/0211788 A1* | 8/2010 | Morohashi ................... 713/170 |

FOREIGN PATENT DOCUMENTS

| JP | 2006-259906 A | 9/2006 |
| JP | 2006-309438 A | 11/2006 |
| JP | 2006-309595 A | 11/2006 |
| JP | 2007-249381 A | 9/2007 |

OTHER PUBLICATIONS

Japanese Office Action for corresponding JP 2009-061287, mail date Feb. 26, 2013.

* cited by examiner

*Primary Examiner* — Justin T Darrow
(74) *Attorney, Agent, or Firm* — Rossi, Kimms & McDowell LLP

(57) ABSTRACT

An information processing apparatus connected to a network via a network interface device and capable of performing encrypted communication with an external apparatus on the network. When the information processing apparatus is operating in a normal power mode, a sleep control module thereof detects whether a condition under which the apparatus shifts to an energy saving mode in which power consumption is smaller than in the normal power mode is satisfied. When the condition is detected to be satisfied, a proxy response registration module of the apparatus instructs an IPSec module of the same to request the external apparatus not to perform encrypted communication.

12 Claims, 11 Drawing Sheets

| POLICY NO. | DESTINATION ADDRESS | Enc alg | Enc key | Auth alg | Auth Key | VALID LIFETIME |
|---|---|---|---|---|---|---|
| 1 | 192.168.1.1 | 3DES | 1234··· | SHA1 | abce··· | 2h |
| 2 | 192.168.1.2 | AES | hoge··· | MD5 | 12ab··· | 8h |
| 3 | 192.168.10.10 | AES | tek··· | SHA1 | 34ddf··· | 1h |

FIG.6

| SORT | LENGTH | NAME | PATTERN |
|---|---|---|---|
| IP | 1 | version | Don't care |
| | 1 | service field | 0 |
| | 2 | total length | Don't care |
| | 2 | identification | Don't care |
| | 1 | flags | 0 |
| | 1 | offset | 0 |
| | 1 | ttl | Don't care |
| | 1 | protocol | UDP |
| | 2 | checksum | Don't care |
| | 4 | source addr | Don't care |
| | 4 | dst addr | own addr |
| UDP | 2 | source port | isakmp |
| | 2 | dst port | isakmp |
| | 2 | length | Don't care |
| | 2 | checksum | Don't care |
| ISAKMP | 8 | init cookie | Don't care |
| | 8 | resp cookie | Don't care |
| | 1 | next payload | Don't care |
| | 1 | version | Don't care |
| | 1 | type | Don't care |
| | 1 | flags | Don't care |
| | 4 | identification | Don't care |
| | 4 | length | Don't care |
| | 96 | SA payload | Don't care |

FIG.7

| SORT | LENGTH | NAME | PATTERN |
|---|---|---|---|
| IP | 1 | version | calculate |
| | 1 | service field | 0 |
| | 2 | total length | calculate |
| | 2 | identification | calculate |
| | 1 | flags | 0 |
| | 1 | offset | 0 |
| | 1 | ttl | 128 |
| | 1 | protocol | UDP |
| | 2 | checksum | calculate |
| | 4 | source addr | calculate |
| | 4 | dst addr | own addr |
| UDP | 2 | source port | isakmp |
| | 2 | dst port | isakmp |
| | 2 | length | calculate |
| | 2 | checksum | calculate |
| ISAKMP | 8 | init cookie | calculate |
| | 8 | resp cookie | calculate |
| | 1 | next payload | calculate |
| | 1 | version | calculate |
| | 1 | type | information |
| | 1 | flags | calculate |
| | 4 | identification | calculate |
| | 4 | length | calculate |
| | 96 | data | fail |

FIG.8

| SORT | LENGTH | NAME | PATTERN |
|---|---|---|---|
| IP | 1 | version | 4 |
| | 1 | service field | 0 |
| | 2 | total length | Don't care |
| | 2 | identification | Don't care |
| | 1 | flags | 0 |
| | 1 | offset | 0 |
| | 1 | ttl | Don't care |
| | 1 | protocol | UDP |
| | 2 | checksum | Don't care |
| | 4 | source addr | Don't care |
| | 4 | dst addr | own IPv4 addr |
| UDP | 2 | source port | Don't care |
| | 2 | dst port | 161 |
| | 2 | length | Don't care |
| | 2 | checksum | Don't care |
| SNMP | 1 | version | Don't care |
| | 6 | community | public |
| | 4 | data | get request |
| | 1 | request ID | 92 |
| | 1 | error status | 0 |
| | 1 | error index | 0 |
| | 11 | name | mib-2.25.3.2.1.5.1 |

FIG.9

| SORT | LENGTH | NAME | PATTERN |
|---|---|---|---|
| IP | 1 | version | 4 |
| | 1 | service field | 0 |
| | 2 | total length | calculate |
| | 2 | identification | calculate |
| | 1 | flags | 0 |
| | 1 | offset | 0 |
| | 1 | ttl | 128 |
| | 1 | protocol | UDP |
| | 2 | checksum | calculate |
| | 4 | source addr | own IPv4 addr |
| | 4 | dst addr | calculate |
| UDP | 2 | source port | 161 |
| | 2 | dst port | calculate |
| | 2 | length | calculate |
| | 2 | checksum | calculate |
| SNMP | 1 | version | calculate |
| | 6 | community | public |
| | 4 | data | get response |
| | 1 | request ID | 92 |
| | 1 | error status | 0 |
| | 1 | error index | 0 |
| | 11 | name | mib-2.25.3.2.1.5.1 |
| | 1 | value | 2 |

INFORMATION PROCESSING APPARATUS, COMMUNICATION SYSTEM, METHOD OF CONTROLLING THEM, AND STORAGE MEDIUM

BACKGROUND OF THE INVENTION

1. Field of the Invention

The present invention relates to an information processing apparatus that is connected to a network via a network interface device and is capable of performing encrypted communication with external apparatuses on the network, and a communication system including the network interface device and the information processing apparatus.

2. Description of the Related Art

Conventionally, there has been known an information processing system provided with an energy saving mode for reducing power consumption in a standby state. As one example of this type of information processing system, there has been proposed a communication system comprised of an information processing apparatus as a main unit which is provided with a main CPU, and a NIC (Network Interface Card) device provided with a sub CPU. In general, a communication system of the above-mentioned type is configured such that during the energy saving mode of the system, the information processing apparatus as the main unit is caused to shift to the energy saving mode, whereas the NIC device, which consumes a smaller amount of energy, is caused to remain on standby while causing power to be normally supplied to modules of the NIC device.

Further, Japanese Patent Laid-Open Publication No. 2006-259906 discloses a method in which immediately before the information processing apparatus as the main unit shifts to the energy saving mode in which power supply to a main CPU is stopped, the main CPU notifies the sub CPU of the address of a multicast packet to be responded to. This method enables the sub CPU to respond, on behalf of the main CPU, to multicast packets received in a state where power supply to the main CPU is stopped, so that it is possible to eliminate the need to start the main CPU. In short, this makes it possible to prolong the stoppage of power supply to the main CPU to thereby enhance the effect of energy saving.

By the way, in recent years, to protect secret information, IPSec (Internet Protocol Security), SSL (Secure Socket Layer) and the like have been proposed as techniques for performing communication by encrypting a network path. The use of these techniques makes it possible to transmit and receive data in an encrypted state over a network to thereby prevent leakage of information.

As described hereinabove, by storing information on packets to be responded to in the NIC device, the NIC device can respond to received packets on behalf of the main-unit information processing apparatus after it has shifted to the energy saving mode.

However, in a case where the NIC device is caused to respond to a packet on behalf of the information processing apparatus, if the packet received via the network is an encrypted one, the NIC device may not be able to properly respond to the packet.

More specifically, to cause the NIC device to respond to a packet on behalf of the information processing apparatus as the main unit, a pattern of a packet to be responded to and a packet to be transmitted as a response to a packet whose pattern matches the pattern are registered in the NIC device in advance. The NIC device having received a packet whose pattern matches the registered pattern transmits the registered packet which is associated with the pattern. At this time, however, in a case where the packet received by the NIC device is an encrypted one, even if the pattern of the packet actually matches the registered pattern, the NIC device determines, through comparison between a pattern of the encrypted packet and the registered pattern, that there is no match between the two.

In this case, it is required to return the information processing apparatus as the main unit from the energy saving mode to a normal power mode and then transfer the packet received by the NIC device to the information processing apparatus. Therefore, the number of times of returning the information processing apparatus as the main unit to the normal power mode increases, resulting in reduced energy saving effects.

SUMMARY OF THE INVENTION

The present invention provides an information processing apparatus that requests an external apparatus not to perform encrypted communication before the information processing apparatus shifts to an energy saving mode, a communication system including the information processing apparatus, methods of controlling them, and storage media storing programs for causing computers to execute the methods, respectively.

In a first aspect of the present invention, there is provided an information processing apparatus that is connected to a network via a network interface device and is capable of performing encrypted communication with an external apparatus on the network, comprising a detection unit configured to be operable in a state where the information processing apparatus is operating in a normal power mode, to detect that a condition under which the information processing apparatus shifts to an energy saving mode in which power consumption is smaller than in the normal power mode is satisfied, and a request unit configured to be operable when the detection unit detects that the condition under which the information processing apparatus shifts to the energy saving mode is satisfied, to request the external apparatus not to perform encrypted communication.

In a second aspect of the present invention, there is provided a communication system including a network interface device, and an information processing apparatus that is connected to a network via the network interface device and is capable of performing encrypted communication with an external apparatus on the network, wherein the information processing apparatus comprises a detection unit configured to be operable in a state where the information processing apparatus is operating in a normal power mode, to detect that a condition under which the information processing apparatus shifts to an energy saving mode in which power consumption is smaller than in the normal power mode is satisfied, a registration unit configured to be operable when the detection unit detects that the condition under which the information processing apparatus shifts to the energy saving mode is satisfied, to register, in the network interface device, proxy response information required to cause the network interface device to respond, on behalf of the information processing apparatus, to data received via the network in a state where the information processing apparatus has shifted to the energy saving mode, and a request unit configured to be operable when the detection unit detects that the condition under which the information processing apparatus shifts to the energy saving mode is satisfied, to request the external apparatus not to perform encrypted communication, and wherein the network interface device comprises a response unit configured to respond, based on the proxy response information registered by the registration unit, to the data received via the network in the state where the information processing apparatus has shifted to the energy saving mode.

In a third aspect of the present invention, there is provided a method of controlling an information processing apparatus that is connected to a network via a network interface device and is capable of performing encrypted communication with an external apparatus on the network, comprising detecting, in a state where the information processing apparatus is operating in a normal power mode, that a condition under which the information processing apparatus shifts to an energy saving mode in which power consumption is smaller than in the normal power mode is satisfied, and requesting the external apparatus not to perform encrypted communication when it is detected that the condition under which the information processing apparatus shifts to the energy saving mode is satisfied.

In a fourth aspect of the present invention, there is provided a method of controlling a communication system including a network interface device, and an information processing apparatus that is connected to a network via the network interface device and is capable of performing encrypted communication with an external apparatus on the network, comprising detecting, in a state where the information processing apparatus is operating in a normal power mode, that a condition under which the information processing apparatus shifts to an energy saving mode in which power consumption is smaller than in the normal power mode is satisfied, registering, when it is detected that the condition under which the information processing apparatus shifts to the energy saving mode is satisfied, in the network interface device, proxy response information required to cause the network interface device to respond, on behalf of the information processing apparatus, to data received via the network in a state where the information processing apparatus has shifted to the energy saving mode, requesting the external apparatus not to perform encrypted communication when it is detected that the condition under which the information processing apparatus shifts to the energy saving mode is satisfied, and responding, based on the registered proxy response information, to the data received via the network in the state where the information processing apparatus has shifted to the energy saving mode.

In a fifth aspect of the present invention, there is provided a computer-readable storage medium storing a program for causing a computer to execute a method of controlling an information processing apparatus that is connected to a network via a network interface device and is capable of performing encrypted communication with an external apparatus on the network, wherein the method comprises detecting, in a state where the information processing apparatus is operating in a normal power mode, that a condition under which the information processing apparatus shifts to an energy saving mode in which power consumption is smaller than in the normal power mode is satisfied, and requesting the external apparatus not to perform encrypted communication when it is detected that the condition under which the information processing apparatus shifts to the energy saving mode is satisfied.

In a sixth aspect of the present invention, there is provided a computer-readable storage medium storing a program for causing a computer to execute a method of controlling a communication system including a network interface device, and an information processing apparatus that is connected to a network via the network interface device and is capable of performing encrypted communication with an external apparatus on the network, wherein the method comprises detecting, in a state where the information processing apparatus is operating in a normal power mode, that a condition under which the information processing apparatus shifts to an energy saving mode in which power consumption is smaller than in the normal power mode is satisfied, registering, when it is detected that the condition under which the information processing apparatus shifts to the energy saving mode is satisfied, in the network interface device, proxy response information required to cause the network interface device to respond, on behalf of the information processing apparatus, to data received via the network in a state where the information processing apparatus has shifted to the energy saving mode, requesting the external apparatus not to perform encrypted communication when it is detected that the condition under which the information processing apparatus shifts to the energy saving mode is satisfied, and responding, based on the registered proxy response information, to the data received via the network in the state where the information processing apparatus has shifted to the energy saving mode.

According to the present invention, it is possible to request an external apparatus not to perform encrypted communication, before the information processing apparatus shifts to the energy saving mode.

Further features of the present invention will become apparent from the following description of exemplary embodiments with reference to the attached drawings.

BRIEF DESCRIPTION OF THE DRAWINGS

FIG. 6 is a table showing an example of an IPSec session request packet pattern.

FIG. 7 is a table showing an example of an IPSec proxy response packet pattern.

FIG. 8 is a table showing an example of a proxy response registration packet pattern.

FIG. 9 is a table showing an example of a proxy response packet pattern.

DETAILED DESCRIPTION OF THE EMBODIMENTS

The present invention will now be described in detail below with reference to the accompanying drawings showing an embodiment thereof. It should be noted that the present invention is not limited to the embodiment described below, and not all combinations of features described in the present embodiment are essential to a solution of the present invention.

Figure 1:
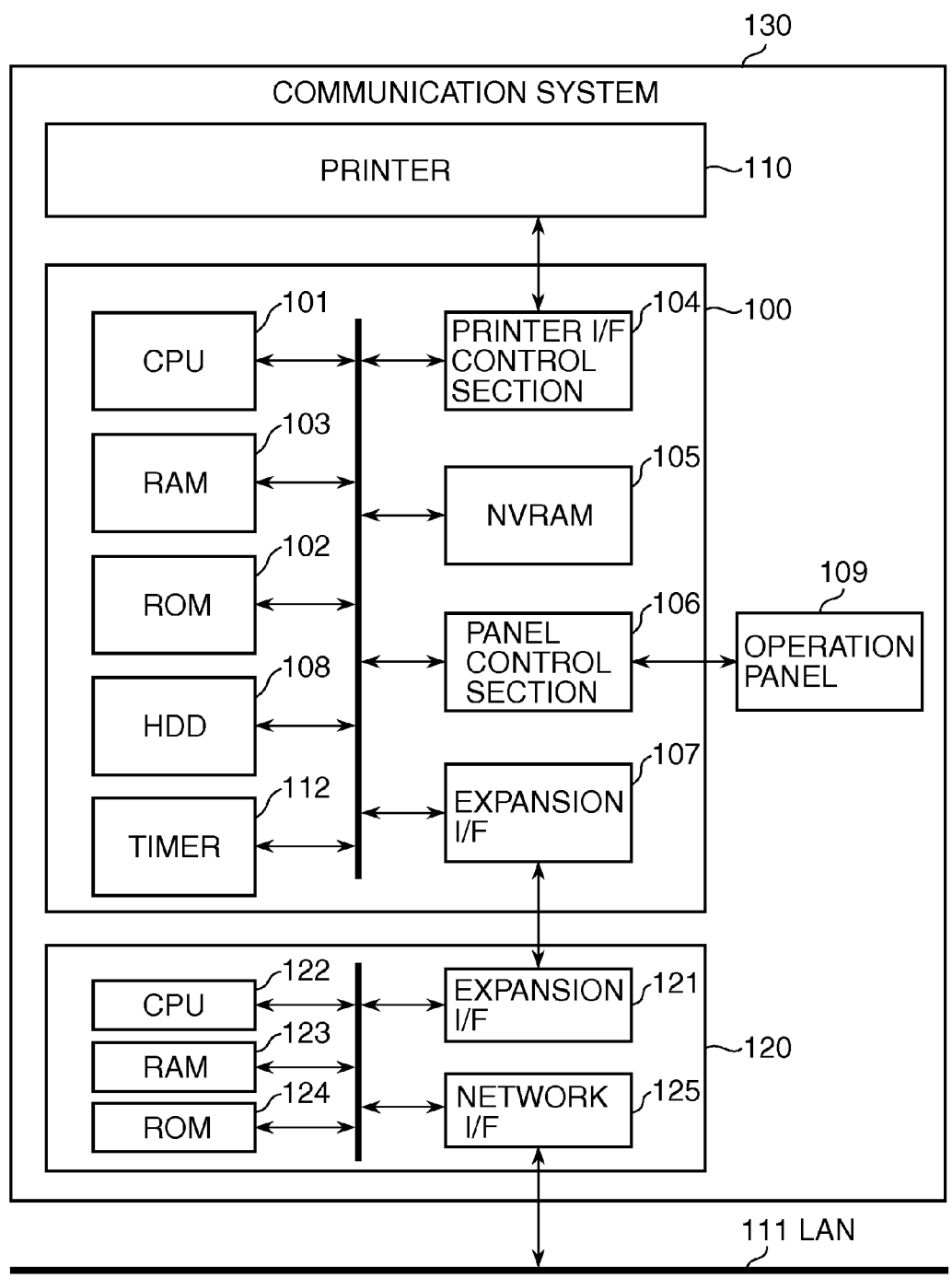
FIG. 1 is a block diagram of the hardware configuration of a communication system.

FIG. 1 is a block diagram of the hardware configuration of a communication system according to the embodiment of the present invention. The communication system 130 includes an information processing apparatus 100, and a NIC 120 (network interface device). The information processing apparatus 100 is connected to a LAN (Local Area Network) 111 via the NIC 120.

A CPU 101 executes software programs for the information processing apparatus 100 to control the overall operation of the apparatus. A RAM (Random Access Memory) 103 is used by the CPU 101 e.g. for temporary data storage so as to control the apparatus. A ROM (Read Only Memory) 102 stores a boot program, fixed parameters, and so forth for the apparatus.

A HDD (Hard Disk Drive) 108 is used to store various data. A timer 112 measures elapsed time. An NVRAM (Non-Volatile RAM) 105 stores various settings of the information processing apparatus 100. A panel control section 106 controls an operation panel 109 such that the panel control section 106 displays various operation screens on a liquid crystal panel included in the operation panel 109 and transfer user instructions input via the respective operation screens to the CPU 101.

A printer interface control section 104 controls a printer 110. An expansion interface 107 is connected to an expansion interface 121 of the NIC 120 to control data communication with external apparatuses on the LAN 111 (network) via the NIC 120.

A CPU 122 executes software programs for the NIC 120 to thereby control the overall operation of the NIC 120. A RAM (Random Access Memory) 123 is used by the CPU 122 e.g. for temporary data storage so as to control the NIC 120. A ROM (Read Only Memory) 124 stores a boot program, fixed parameters, and so forth for the NIC 120.

The expansion interface 121 is connected to the expansion interface 107 of the information processing apparatus 100 to control data communication between the information processing apparatus 100 and the NIC 120. A network interface 125 is connected to the LAN 111 to control data communication between the NIC 120 (the information processing apparatus 100, the communication system 130) and the external apparatuses on the LAN 111.

The information processing apparatus 100 is capable of switching between a normal power mode and an energy saving mode in which power consumption is smaller than in the normal power mode. When the information processing apparatus 100 shifts from the normal power mode to the energy saving mode, power supply to the CPU 101, the HDD 108, and the NVRAM 105 is stopped. On the other hand, the NIC 120 is operated by an ACIC (Application Specific Integrated Circuit) different from that of the information processing apparatus 100. For this reason, even in a state where the information processing apparatus 100 has shifted to the energy saving mode, power supply to the NIC 120 is continued, which makes it possible to realize a proxy response function described hereinafter.

Figure 2:
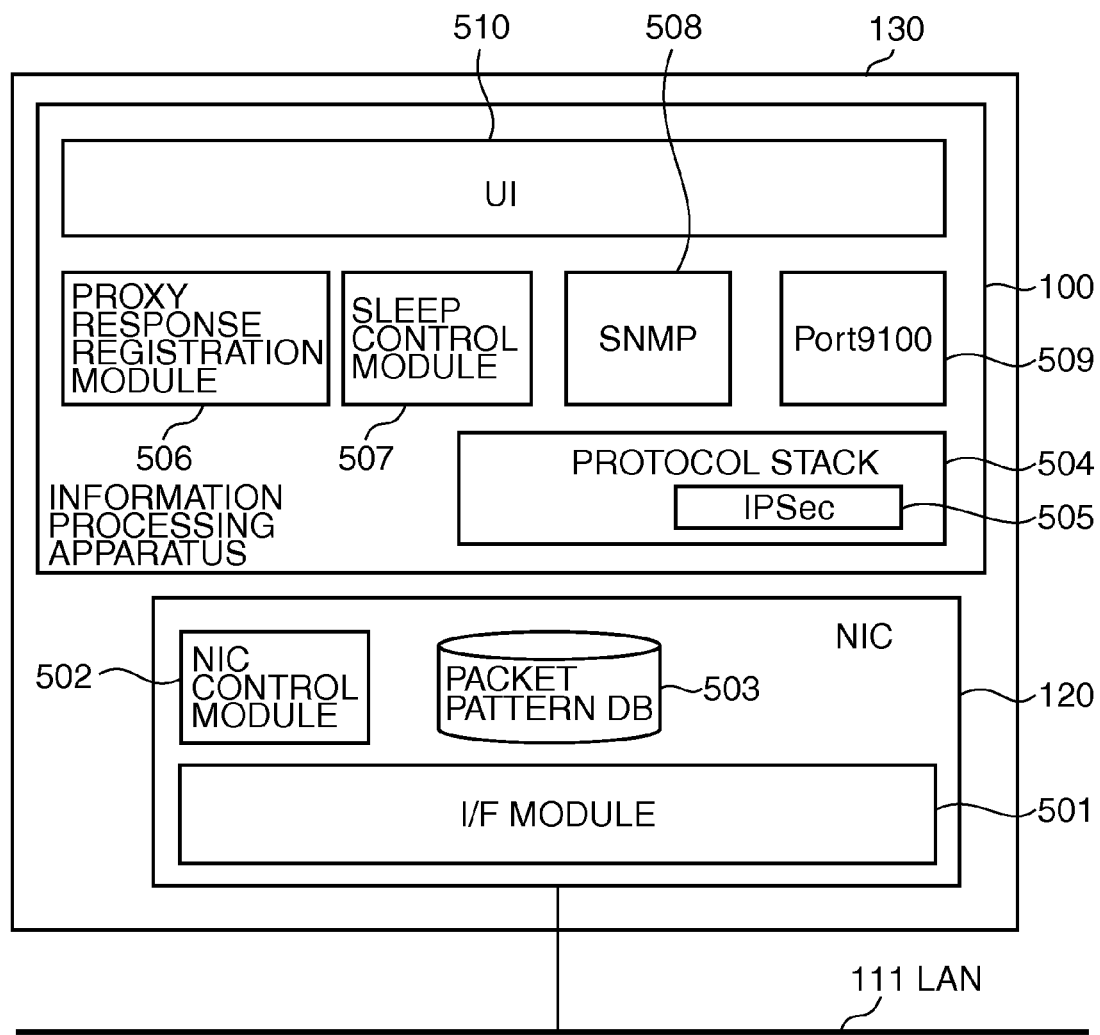
FIG. 2 is a block diagram of the software configuration of the communication system.

FIG. 2 is a diagram of the software configuration of the communication system 130. The software of the communication system 130 can be roughly divided into software of the information processing apparatus 100 and software of the NIC 120. The software of the NIC 120 includes an interface module 501 for transmitting/receiving network packets to/from the external LAN 111, a NIC control module 502 for starting the NIC or exchanging information with the information processing apparatus 100, and a packet pattern database (DB) 503 for registering proxy response packet patterns.

The information processing apparatus 100 is provided with a protocol stack 504 including an IPSec module 505 that determines whether or not a packet to be transmitted or received is for IPSec and encrypts or decrypts the packet.

Further, the information processing apparatus 100 includes an SNMP module 508 for exchanging SNMP packets with external apparatuses via the protocol stack 504, and a Port 9100 module 509 for performing printing. Furthermore, the information processing apparatus 100 includes a sleep control module 507 for switchingly controls the power mode by shifting the information processing apparatus 100 to the energy saving mode or returning the same to the normal power mode, and a proxy response registration module 506 for registering proxy response packet patterns in the NIC 120. What is more, the information processing apparatus 100 is provided with a user interface module 510 to enable a user to configure settings concerning the above-mentioned functions.

Figure 3:
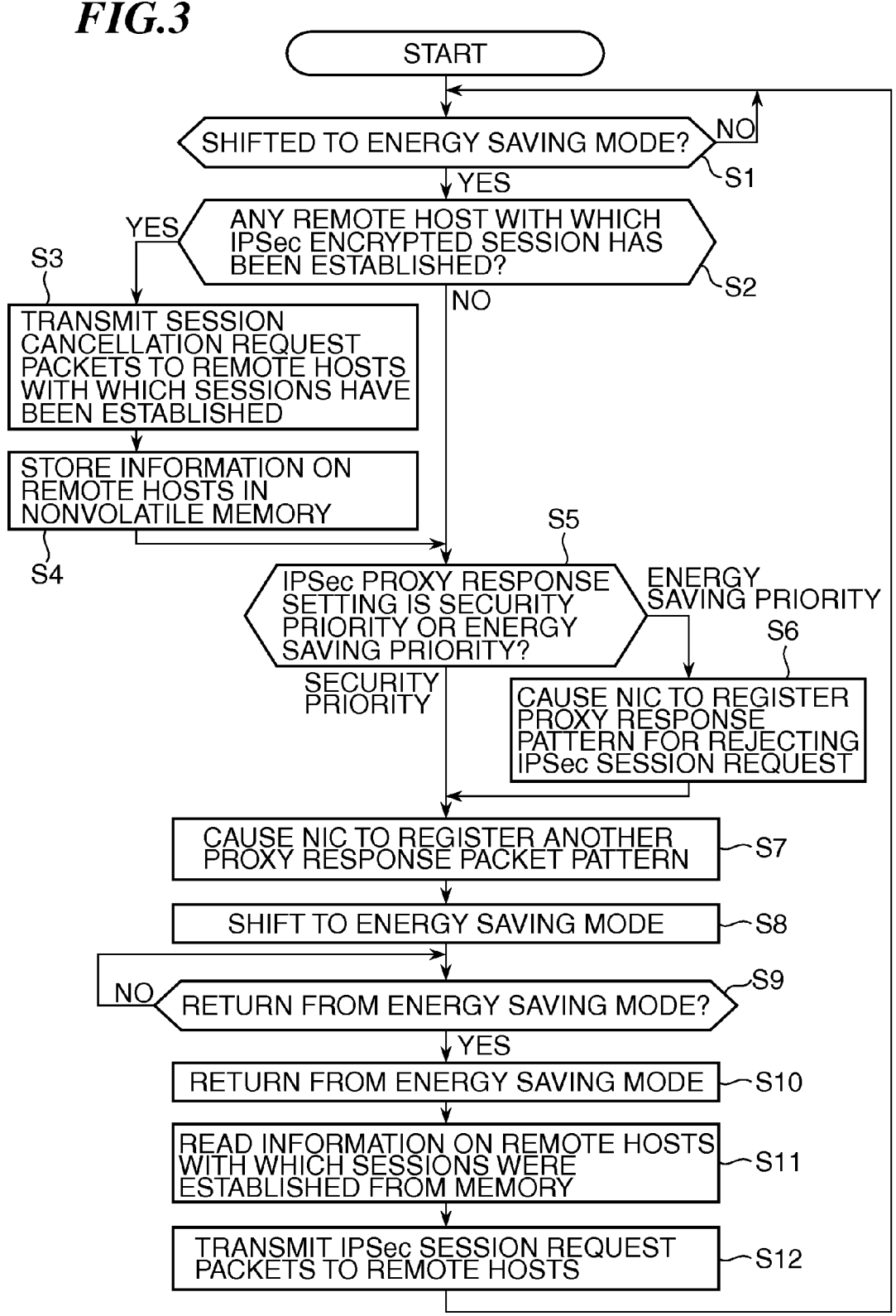
FIG. 3 is a flowchart of a power mode switching process executed by an information processing apparatus.

Next, a description will be given of the operation of the communication system 130 configured as above. FIG. 3 is a flowchart of a power mode switching process executed by the information processing apparatus 100 within the communication system 130. A program for the present process is stored in the ROM 102 and is executed by the CPU 101.

First, the information processing apparatus 100 determines whether or not the sleep control module 507 has detected that a condition for shifting the information processing apparatus 100 from the normal power mode to the energy saving mode is satisfied (step S1). In the present process, the sleep control module 507 of the information processing apparatus 100 constantly executes a loop to monitor whether the condition for shifting the information processing apparatus 100 to the energy saving mode is satisfied. If the condition for shifting the information processing apparatus 100 to the energy saving mode is not satisfied, the information processing apparatus 100 repeatedly carries out the step S1, whereas if the condition for shifting the information processing apparatus 100 to the energy saving mode is satisfied, the information processing apparatus 100 starts preparation for shifting to the energy saving mode.

Here, as the condition for shifting the information processing apparatus 100 to the energy saving mode, there may be mentioned a case where no network packets from the external apparatuses to the self apparatus have been received over a predetermined time period or a case where the user has not operated the information processing apparatus 100 over a predetermined time period.

Figures 4, 5:
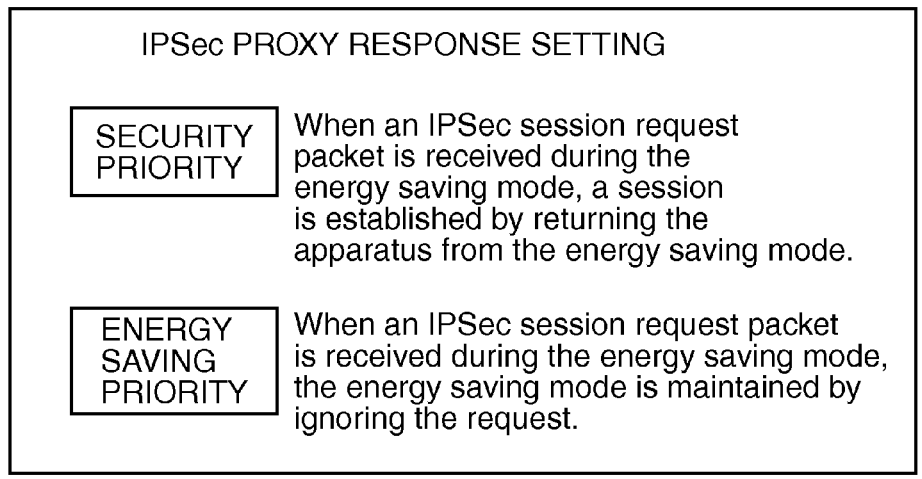
FIG. 4 is a table showing a policy information list stored in an IPSec module section.
FIG. 5 is a view of an IPSec proxy response setting screen displayed as a user interface on an operation panel.

The information processing apparatus 100 causes the proxy response registration module 506 to query the IPSec module 505 and check whether or not there is an external apparatus with which an IPSec encrypted session has already been established (step S2). The processing in the step S2 is an example of processing by a determination unit by the present invention. As shown in FIG. 4, the IPSec module 505 stores policy information based on which a session for performing encrypted communication has been established in an internal memory (recording medium) thereof.

FIG. 4 is a table showing a policy information list stored in the IPSec module 505. In the table in FIG. 4, an IP address (dst addr), an encryption algorism (Enc alg), and an encryption key (Enc key) are shown as policy information items. Further, there are also shown an authentication algorism (Auth alg), an authentication key (Auth Key), and a valid lifetime (valid lifetime), as policy information items.

In the example shown in FIG. 4, the information processing apparatus 100 capable of encrypted communication has established sessions for performing IPSec encrypted communication with three external apparatuses. More specifically, the information processing apparatus 100 has established a first session with a host assigned an IP address of "192.168.1.1", using 3DES as an encryption algorism and SHA1 as an authentication algorism, with a lifetime of two hours, a second session with a host assigned an IP address of "192.168.1.2", using AES as an encryption algorism and MD5 as an authentication algorism, with a lifetime of eight hours, and a third session with a host assigned an IP address of "192.168.10.10", using AES as an encryption algorism and SHA1 as an authentication algorism, with a lifetime of one hour.

If the IPSec module 505 stores policy information as described above, the process proceeds to a step S3, whereas if not, the process directly proceeds to a step S5.

In the information processing apparatus 100, when there is at least one host with which an IPSec session has been established, the proxy response registration module 506 instructs the IPSec module 505 to transmit session cancellation request packets to the hosts with which respective sessions have been established (step S3). Upon receipt of this instruction, the IPSec module 505 transmits the IPSec session cancellation request packet to each of the hosts with which respective sessions have been established.

According to the example shown in FIG. 4, the IPSec session cancellation request packets are transmitted by unicast to the three hosts assigned the respective IP addresses "192.168.1.1", "192.168.1.2", and "192.168.10.10". In response to this packet transmission, the policy information held by each of the remote hosts is discarded.

The information processing apparatus 100 causes the proxy response registration module 506 to store only remote address information of the policy information stored in the IPSec module 505, in a nonvolatile memory (HDD 108 or the like) (step S4). More specifically, in the FIG. 4 example, three information items of the respective IP addresses "192.168.1.1", "192.168.1.2", and "192.168.10.10" are stored.

The information processing apparatus 100 causes the proxy response registration module 506 to determine whether an IPSec proxy response setting is set to "security priority" or "energy saving priority" (step S5).

FIG. 5 is a view of an IPSec proxy response setting screen displayed as a user interface on the operation panel 109. The IPSec proxy response setting includes a "security priority" setting and an "energy saving priority" setting as shown in FIG. 5.

In the "security priority" setting, when an IPSec session request packet is received in the energy saving mode, the main unit (image processing apparatus 100) is returned from the energy saving mode to the normal power mode, and a session is established. On the other hand, in the "energy saving priority" setting, when an IPSec session request packet is received in the energy saving mode, the request is ignored, and the energy saving mode is maintained.

If the IPSec proxy response setting is set to "security priority", the process skips over a step S6 to a step S7. On the other hand, if the IPSec proxy response setting is set to "energy saving priority", the image processing apparatus 100 causes the proxy response registration module 506 to notify the NIC 120 of a proxy response pattern (proxy response information) for rejecting the IPSec session request, and cause the NIC 120 to register the proxy response pattern (step S6).

Thus there are registered an IPSec session request packet pattern of an IPSec session request packet (see FIG. 6) and an IPSec proxy response packet pattern (see FIG. 7) of a response packet for rejecting the IPSec session request packet. FIG. 6 is a table showing an example of the IPSec session request packet pattern, and FIG. 7 is a table showing an example of the IPSec proxy response packet pattern. The tables in FIGS. 6 and 7 contain registered items of the sort, length, name, and pattern of each packet.

On the other hand, if it is determined in the step S5 that the IPSec proxy response setting is set to "security priority", or after the step S6 is executed, the information processing apparatus 100 causes the proxy response registration module 506 to register another proxy response packet pattern, if any, in the NIC 120 (step S7). The other proxy response packet pattern includes, for example, packet patterns of an SNMP proxy response (see FIGS. 8 and 9) and an ICMP (Internet Control Message Protocol) response. It should be noted that in FIG. 8, SNMP indicates packet pattern information for identifying an SNMP request out of packets transmitted from an external apparatus. Further, FIG. 9 illustrates an SNMP response packet to be transmitted in a case where the NIC 120 responds on behalf of the information processing apparatus 100.

After the preparation for shifting to the energy saving mode is thus completed, the information processing apparatus 100 shifts to the energy saving mode (step S8).

Then, the information processing apparatus 100 is kept on standby until occurrence of an event for returning the information processing apparatus 100 from the energy saving mode to the normal power mode (step S9). The event that returns the information processing apparatus 100 from the energy saving mode to the normal power mode includes e.g. receipt of a WakeUp packet via the network, and pressing of an energy saving switch, not shown, on the operation panel (operating section) 109 is pressed.

If the event occurs, the information processing apparatus 100 returns from the energy saving mode to the normal power mode under the control of the sleep control module 507 (step S10). At this time, there is a possibility that the information processing apparatus 100 had established an IPSec session with an external apparatus before shifting to the energy saving mode. Therefore, upon returning from the energy saving mode, the information processing apparatus 100 reads from the nonvolatile memory (recording medium such as the HDD 108) information on external apparatuses (hereafter also referred to as "external hosts") with which the IPSec session had been established (step S11).

A description will be given of a case where information is read which indicates that IPSec sessions had been established with three external hosts, as shown in FIG. 4, by way of example. In this case, the Information processing apparatus 100 causes the IPSec module 505 to transmit IPSec session request packets to the respective three external hosts (step S12). Through this session request processing, the information processing apparatus 100 can establish the same IPSec sessions as those established before shifting to the energy saving mode again.

Although in the present embodiment, the storage of IPSec session information, the instruction for transmitting IPSec session request packets, and like processing are executed by the proxy response registration module 506, they may be executed by the IPSec module 505.

Figure 10:
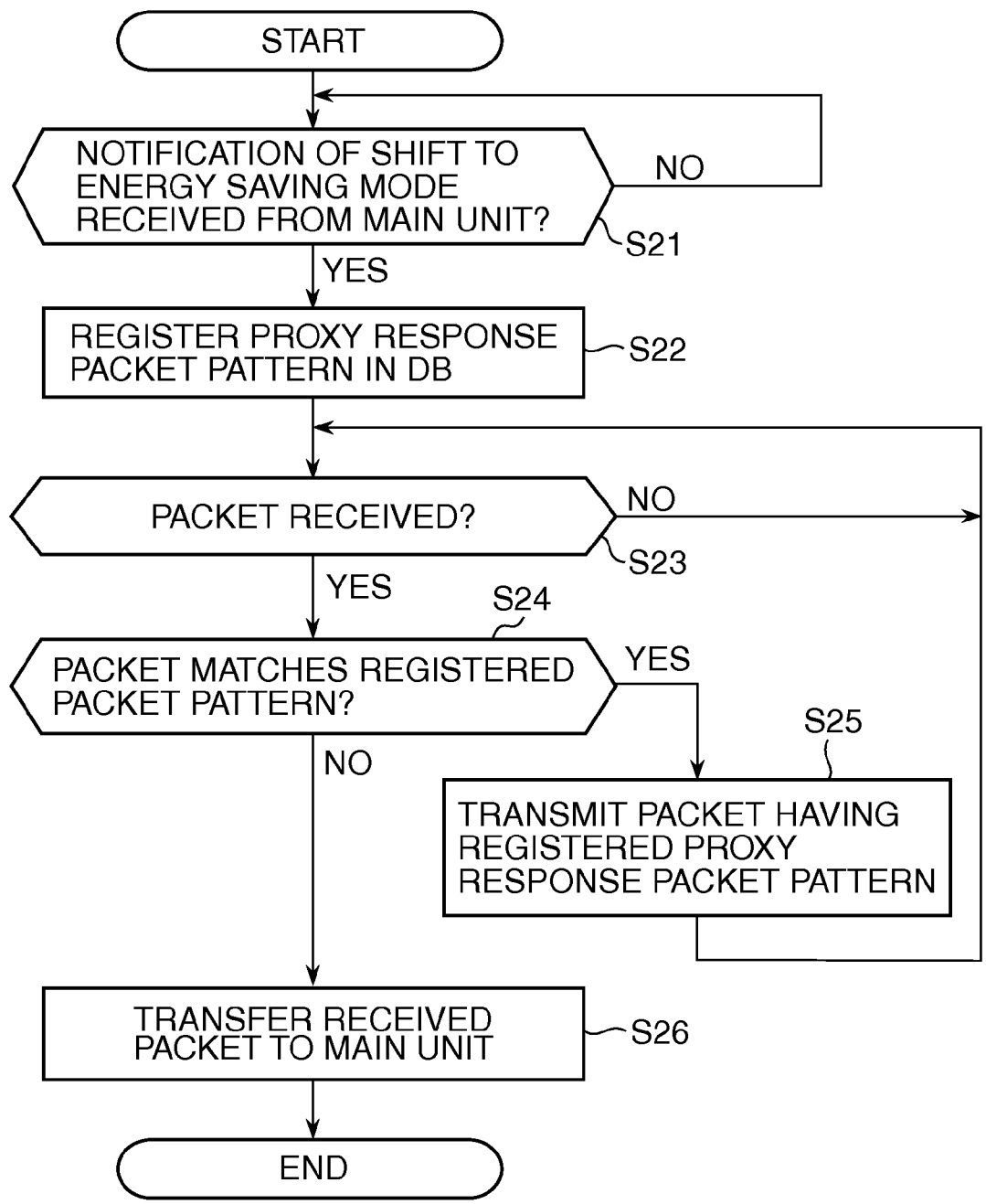
FIG. 10 is a flowchart of an energy saving mode process executed by a NIC.

FIG. 10 is a flowchart of an energy saving mode process executed by the NIC 120. A program for the present process is stored in the ROM 124 and is executed by the CPU 122. First, the NIC 120 causes the NIC control module 502 waits for the information processing apparatus 100 to shift to the energy saving mode. More specifically, the NIC 120 determines whether a notification indicating that the information processing apparatus 100 is shifting to the energy saving mode is received from the information processing apparatus 100 (step S21).

When the NIC control module 502 receives the notification indicating that the information processing apparatus 100 is shifting to the energy saving mode, the NIC 120 also receives a proxy response packet pattern from the information processing apparatus 100 at the same time. The NIC 120 stores the proxy response packet pattern received via the NIC control module 502 in the packet pattern DB (database) 503 (step S22).

Then, after the information processing apparatus 100 shifts to the energy saving mode, the NIC 120 waits for the interface module 501 to receive a packet (step S23). When the packet is received via the Interface module 501, the NIC control module 502 refers to the packet pattern DB 503 and determines whether or not the received packet matches a packet pattern registered in the packet pattern DB 503 (step S24).

If it is determined that the received packet matches a registered packet pattern, the NIC 120 transmits a packet having a proxy response packet pattern registered in advance in association with the packet pattern, via the interface module 501 (step S25). For example, let it be assumed that the IPSec session request packet pattern shown in FIG. 6 and the IPSec proxy response packet pattern as shown in FIG. 7 which notifies negotiation failure to thereby respond rejection to the IPSec session request packet have been registered by the information processing apparatus 100.

When the NIC 120 receives the IPSec session request packet shown in FIG. 6, it is determined in the step S24 that the pattern of this IPSec session request packet matches one of the IPSec session request packet patterns registered for proxy response. Therefore, the NIC 120 transmits a response packet having the IPSec proxy response packet pattern shown in FIG. 7, and then returns to the step S23.

On the other hand, if it is determined in the step S24 that the pattern of this IPSec session request packet does not match any of the IPSec session request packet patterns registered for proxy response, the NIC 120 transfers the received packet to the information processing apparatus 100 to cause the same to be started (step S26), followed by terminating the present process. It should be noted that in the step S26, the received packet may be discarded instead of being transferred to the information processing apparatus 100.

Figure 11:
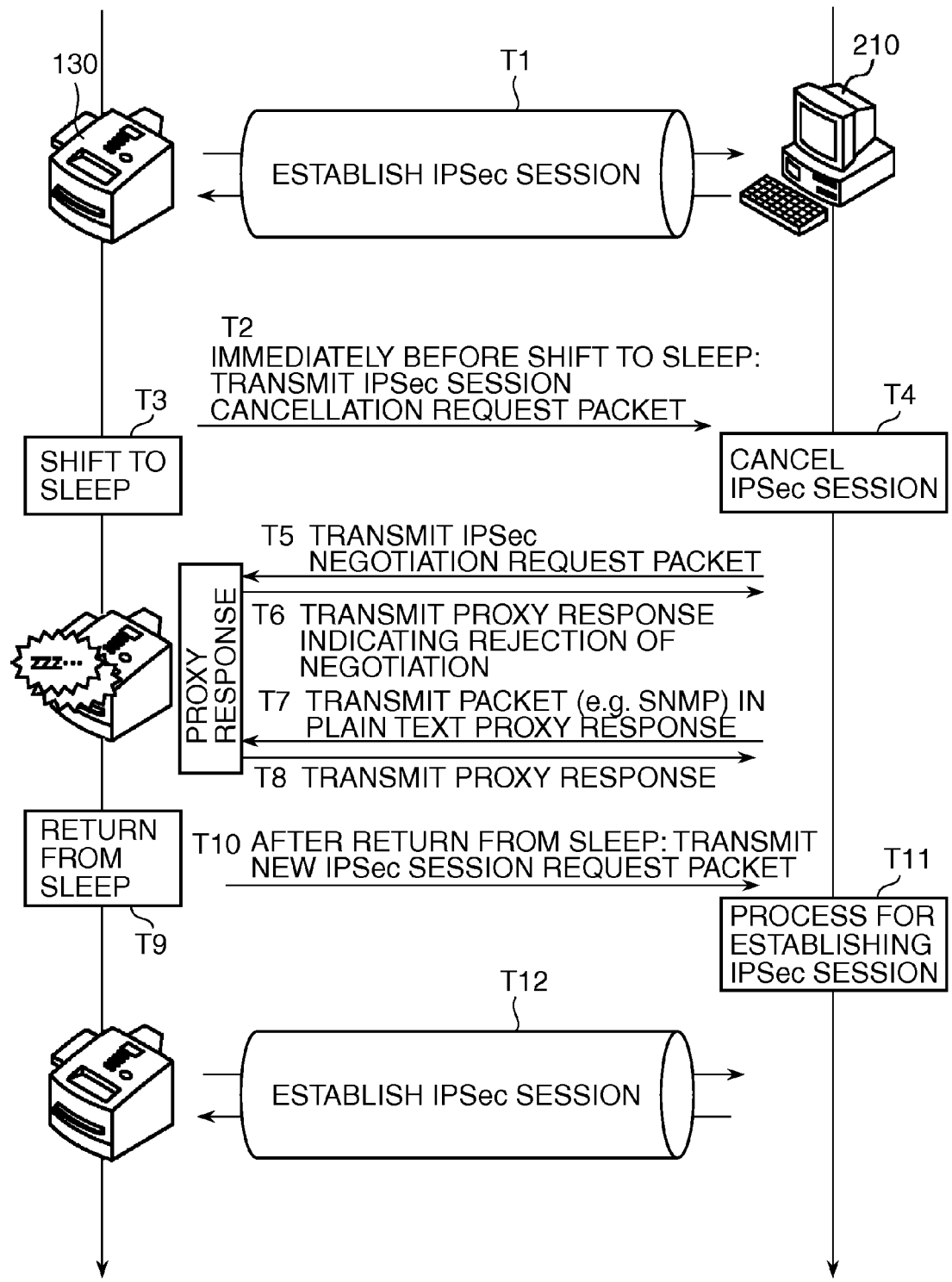
FIG. 11 is a diagram of an operation sequence executed when an "energy saving priority" setting is selected.

FIG. 11 is a diagram of an operation sequence executed when "energy saving priority" is set. The communication system 130 and an external host 210 are assumed to have established an IPSec session (T1).

When a condition for shifting the information processing apparatus 100 to the energy saving mode is satisfied, the communication system 130 transmits an IPSec session cancellation request packet to the external host 210 (T2) before the information processing apparatus 100 shifts to the energy saving mode. Then, the information processing apparatus 100 shifts to the energy saving mode (T3).

On the other hand, upon receipt of the IPSec session cancellation request packet, the external host 210 cancels the IPSec session in response to the request (T4).

In a case where a need for access to the communication system 130 arises while the information processing apparatus 100 within the communication system 130 is in the energy saving mode, the external host 210 attempts to access the communication system 130 (T5). For example, in the case of requesting the communication system 130 to execute print processing, the external host 210 performs SNMP polling once every ten minutes.

At this time, the external host 210 is assumed to be configured to "perform IPSec communication with the communication system 130", and hence an IPSec session request packet is transmitted first, irrespective of the protocol type.

The information processing apparatus 100 within the communication system 130 operates according to a predetermined operational procedure set in association with the setting of "energy saving priority", and hence a response packet (hereafter also referred to as "the IPSec session request rejection packet") for rejecting the IPSec session request packet is transmitted as a response (T6).

Upon receipt of the IPSec session request rejection packet, the external host 210 determines that IPSec communication is impossible, and performs SNMP access in a plain text without IPSec encryption (T7).

Since an SNMP packet for the SNMP access is included in packets to be responded to by proxy, the NIC 120 within the communication system 130 responds by proxy response without starting the information processing apparatus 100 (T8).

Thereafter, when the condition for returning the information processing apparatus 100 to the normal power mode is satisfied and the information processing apparatus 100 returns to the normal power mode (T9), the communication system 130 operates as follows: The communication system 130 transmits a request packet for establishing the IPSec session again to the external host 210 with which the session had been established before the information processing apparatus 100 shifted to the energy saving mode (T10). The external host 210 executes processing for establishing an IPSec encrypted session (T11), whereafter the information processing apparatus 100 within the communication system 130 and the external host 210 establish the IPSec session again (T12).

Thus, when "energy saving priority" is set, it is possible to reject the IPSec session request and maintain the energy saving mode using the proxy response module.

Figure 12:
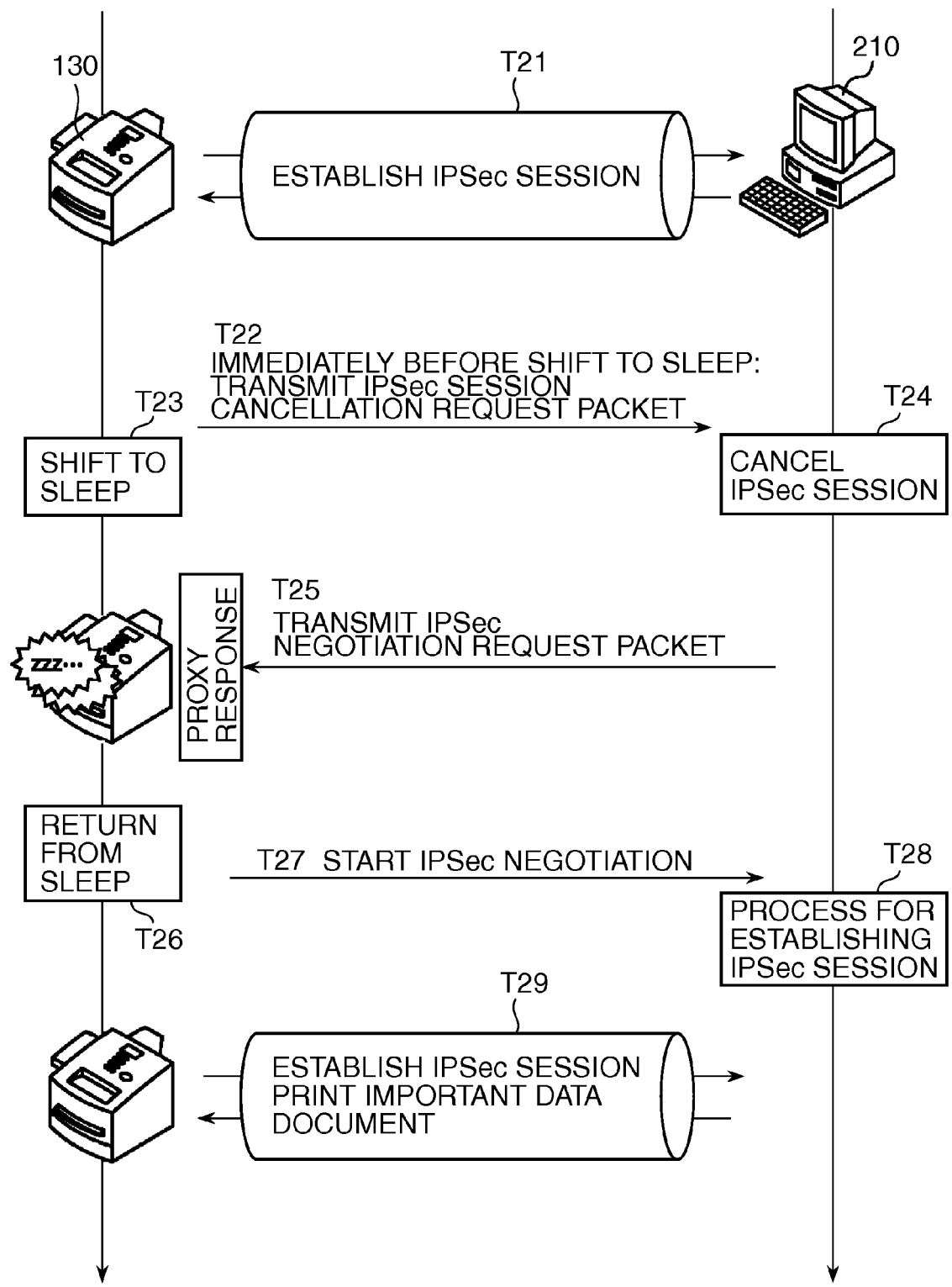
FIG. 12 is a diagram of an operation sequence executed when a "security priority" setting is selected.

FIG. 12 is a diagram of an operation sequence executed when "security priority" is set. The communication system 130 and the external host 210 are assumed to have established an IPSec session (T21).

When the condition for shifting the information processing apparatus 100 to the energy saving mode is satisfied, the communication system 130 transmits an IPSec session cancellation request packet to the external host 210 (T22) before shifting to the energy saving mode. Then, the information processing apparatus 100 shifts to the energy saving mode (T23).

On the other hand, upon receipt of the IPSec session cancellation request packet, the external host 210 cancels the IPSec session in response to the request (T24).

In case where a need for access to the communication system 130 arises while the information processing apparatus 100 within the communication system 130 is in the energy saving mode, the external host 210 attempts to access the communication system 130 (T25). For example, the need can arise in a case where it is desired to print important confidential data using the communication system 130. In this case, it is required to perform communication not in plain text but using IPSec encryption without fail.

At this time, since the external host 210 is assumed to be configured to "perform IPSec communication with the communication system 130", an IPSec session request packet is transmitted first, irrespective of the protocol type.

At this time, the information processing apparatus 100 within the communication system 130 operates according to a predetermined operational procedure set in association with the setting of "energy saving priority", and hence the communication system 130 accepts the IPSec session request packet and causes the information processing apparatus 100 to be started (T26).

When the information processing apparatus 100 is started, the received IPSec session request packet is transferred to the IPSec module 505 of the information processing apparatus 100. Then, the information processing apparatus 100 causes the IPSec module 505 to start IPSec negotiation with the external host 210 (T27). The information processing apparatus 100 executes processing for establishing an IPSec encrypted session (T28), the external host 210 causes the communication system 130 to execute printing of print data encrypted by IPSec (T29).

Further, during communication processing for execution of the print processing, not only for a case where the Port 9100 protocol is used for printing, but also for a case where the SNMP protocol mentioned above is used for printing, the same operation for establishing the IPSec session is executed.

Thus, in the case of "security priority" being set, although the IPSec session request is accepted and the information processing apparatus 100 is started, it is possible to constantly maintain security.

According to the configuration described above, a packet for cancelling an IPSec session is transmitted to an external apparatus in timing synchronous with shift to the energy saving mode, and a packet for establishing an IPSec session is transmitted to the external apparatus in timing synchronous with return to the normal power mode. This enables the NIC to perform the proxy response function when the information processing apparatus is in the energy saving mode, to thereby achieve energy saving equivalent to the conventional energy saving even when IPSec is used.

Further, it is possible to register a proxy response packet pattern in the NIC before the information processing apparatus shifts to the energy saving mode. Furthermore, it is possible to utilize an IPSec security technique.

What is more, since a mode of security priority is provided, it is also possible to constantly transmit and receive packets using IPSec. Consequently, a user can select the mode of security priority or a mode of energy saving priority, depending on the network environment, which makes it possible to realize a desired operation in a manner meeting user needs. Thus, the proxy response function can be realized during the energy saving mode, so that it is possible to achieve energy saving equivalent to the conventional energy saving even when the security technique (IPSec) is used.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-061287, filed Mar. 13, 2009, which is hereby incorporated by reference herein in its entirety.

What is claimed is:

1. An information processing apparatus that is connectable to a network via a network interface device and communicable with an external apparatus on the network, the information processing apparatus comprising:
    a communication unit configured to perform encrypted communication with the external apparatus, in a case where the information processing apparatus is in a first power mode;
    a detection unit configured to detect that a condition under which the information processing apparatus shifts from the first power mode to a second power mode in which power consumption is smaller than in the first power mode is satisfied; and
    a request unit configured to request the external apparatus on the network to not perform encrypted communication when said detection unit detects that the condition under which the information processing apparatus shifts from the first power mode to the second power mode is satisfied,
    wherein the network interface device performs unencrypted communication with the external apparatus, in a case where the information processing apparatus is in the second power mode.

2. The information processing apparatus according to claim 1, wherein said request unit requests the external apparatus to cancel a session which is established for the external apparatus to perform encrypted communication with the information processing apparatus.

3. The information processing apparatus according to claim 1, wherein when the information processing apparatus shifts from the second power mode to the first power mode, said request unit requests the external apparatus to perform the encrypted communication with the information processing apparatus.

4. The information processing apparatus according to claim 1, wherein the encrypted communication is performed using IPSec.

5. A method of controlling an information processing apparatus that is connectable to a network via a network interface device and communicable with an external apparatus on the network, the method comprising the steps of:
    performing encrypted communication with the external apparatus, with a communication unit, in a case where the information processing apparatus is in a first power mode;
    detecting that a condition under which the information processing apparatus shifts from the first power mode to a second power mode in which power consumption is smaller than in the first power mode is satisfied;
    requesting the external apparatus on the network to not perform encrypted communication when the detecting step detects that the condition under which the information processing apparatus shifts from the first power mode to the second power mode is satisfied; and
    performing unencrypted communication with the external apparatus, with the network interface, in a case where the information processing apparatus is in the second power mode.

6. A non-transitory computer-readable storage medium storing a program executable by a computer to execute a method of controlling an information processing apparatus that is connectable to a network via a network interface device and communicable with an external apparatus on the network, wherein the method comprises the steps of:
    a communication step of performing encrypted communication with the external apparatus, with a communication unit, in a case where the information processing apparatus is in a first power mode;
    detecting that a condition under which the information processing apparatus shifts from the first power mode to a second power mode in which power consumption is smaller than in the first power mode is satisfied; and
    requesting the external apparatus on the network to not perform encrypted communication when the detecting step detects that the condition under which the information processing apparatus shifts from the first power mode to the second power mode is satisfied; and performing unencrypted communication with the external apparatus, with the network interface, in a case where the information processing apparatus is in the second power mode.

7. A communication system comprising:

an information processing apparatus; and a network interface device, wherein the information processing apparatus is communicable with an external apparatus on a network, the information processing apparatus comprising:

a first communication unit configured to perform encrypted communication with the external apparatus, in a case where the communication system is in a first power mode;

a detection unit configured to detect a condition under which the communication system shifting from the first power mode to a second power mode in which power consumption is smaller than in the first power mode is satisfied;

a request unit configured to request the external apparatus on the network to not perform encrypted communication when said detection unit detects the condition under which the communication system shifting from the first power mode to the second power mode is satisfied, the network interface device comprising:

a second communication unit configured to perform unencrypted communication with the external apparatus, in a case where the communication system is in the second power mode.

8. The communication system according to claim 7, wherein said request unit requests the external apparatus to cancel a session which is established for the external apparatus to perform encrypted communication with the communication system.

9. The communication system according to claim 7, wherein said request unit requests the external apparatus to perform the encrypted communication with the communication system, when the communication system shifts from the second power mode to the first power mode.

10. The communication system according to claim 7, wherein the encrypted communication is performed using IPSec.

11. A method of controlling a communication system comprising a network interface device and an information processing apparatus communicable with an external apparatus on a network, the information processing apparatus having a first communication unit, a detection unit, and a request unit, and the network interface device having a second communication unit, the method comprising:

a first communication step of performing, with the first communication unit, encrypted communication with the external apparatus, in a case where the communication system is in a first power mode;

a detection step of detecting, with the detecting unit, a condition under which the communication system shifting from the first power mode to a second power mode in which power consumption is smaller than in the first power mode is satisfied;

a request step of requesting, with the request unit, the external apparatus on the network to not perform encrypted communication when said detection step detects the condition under which the communication system shifting from the first power mode to the second power mode is satisfied;

a second communication step of performing, with the second communication unit, unencrypted communication with the external apparatus, in a case where the communication system is in the second power mode.

12. A non-transitory computer-readable storage medium storing a program executable by a computer to execute a method of controlling a communication system comprising a network interface device and an information processing apparatus communicable with an external apparatus on a network, the information processing apparatus having a first communication unit, a detection unit, and a request unit, and the network interface device having a second communication unit, the method comprising:

a first communication step of performing, with the first communication unit, encrypted communication with the external apparatus, in a case where the communication system is in a first power mode;

a detection step of detecting, with the detecting unit, a condition under which the communication system shifting from the first power mode to a second power mode in which power consumption is smaller than in the first power mode is satisfied;

a request step of requesting, with the request unit, the external apparatus on the network to not perform encrypted communication when said detection step detects the condition under which the communication system shifting from the first power mode to the second power mode is satisfied;

a second communication step of performing, with the second communication unit, unencrypted communication with the external apparatus, in a case where the communication system is in the second power mode.

* * * * *